(12) United States Patent
Schmidt et al.

(10) Patent No.: US 9,664,582 B2
(45) Date of Patent: May 30, 2017

(54) DEVICE AND METHOD FOR CALIBRATING AND BALANCING A MEASURING DEVICE OF A TABLET PRESS

(75) Inventors: Ingo Schmidt, Schwarzenbek (DE);
Ulrich Gathmann, Hamburg (DE);
Matthias Meier, Schwarzenbek (DE)

(73) Assignee: FETTE COMPACTING GMBH, Schwarzenbek (DE)

( * ) Notice: Subject to any disclaimer, the term of this patent is extended or adjusted under 35 U.S.C. 154(b) by 674 days.

(21) Appl. No.: 14/116,267

(22) PCT Filed: Apr. 19, 2012

(86) PCT No.: PCT/EP2012/001689
§ 371 (c)(1),
(2), (4) Date: Feb. 10, 2014

(87) PCT Pub. No.: WO2012/152373
PCT Pub. Date: Nov. 15, 2012

(65) Prior Publication Data
US 2014/0144205 A1 May 29, 2014

(30) Foreign Application Priority Data
May 10, 2011 (DE) ........................ 10 2011 101 294

(51) Int. Cl.
*G01L 25/00* (2006.01)
*B30B 11/00* (2006.01)
*B30B 11/08* (2006.01)

(52) U.S. Cl.
CPC ............ *G01L 25/00* (2013.01); *B30B 11/005* (2013.01); *B30B 11/08* (2013.01)

(58) Field of Classification Search
None
See application file for complete search history.

(56) References Cited

U.S. PATENT DOCUMENTS 5,229,044 A 7/1993 Shimada et al.
6,325,609 B1 12/2001 Shimada

FOREIGN PATENT DOCUMENTS

| CN | 101334330 | 12/2008 |
|---|---|---|
| DE | 102004040163 | 5/2006 |
| DE | 202007015275 | 6/2008 |
| EP | 1714775 | 10/2006 |
| JP | S63252700 A | 10/1988 |

(Continued)

*Primary Examiner* — Robert R Raevis
(74) *Attorney, Agent, or Firm* — Vidas Arrett & Steinkraus (57) ABSTRACT

Device for calibrating and balancing a measuring device of a tablet press, in particular a rotary tablet press, comprising at least one reference measuring device and at least one control device, wherein interfaces of the control device are connected with interfaces of the measuring device and the reference measuring device, wherein the control device is designed to generate a plurality of reference measurement results and to record the associated measurement values of the measuring device and the reference measuring device, wherein the control device further comprises a comparing device, with which the recorded measurement values of the measuring device and the reference measuring device can be compared with each other, and wherein the control device is designed to balance the measuring device if an impermissible deviation is present between the compared measurement values. The invention also relates to a corresponding method.

16 Claims, 3 Drawing Sheets

(56) References Cited

FOREIGN PATENT DOCUMENTS

| JP | H0623597 A | 2/1994 |
| JP | H07266094 A | 10/1995 |
| JP | 2001226941 A | 8/2001 |
| WO | 2007/102205 A1 | 9/2007 |

DEVICE AND METHOD FOR CALIBRATING AND BALANCING A MEASURING DEVICE OF A TABLET PRESS

CROSS-REFERENCE TO RELATED APPLICATIONS

This application is a U.S. National Stage Application which claims priority to PCT/EP2012/001689, filed Apr. 19, 2012, which claims priority to DE 10 2011 101 294 filed May 10, 2011, the entire contents of which are hereby incorporated by reference.

STATEMENT REGARDING FEDERALLY SPONSORED RESEARCH

Not applicable

BACKGROUND OF THE INVENTION

The invention relates to a device and a method for calibrating and balancing a measuring device of a tablet press, in particular a rotary tablet press. A rotary tablet press normally has a rotor, which is driven in a rotating manner via a generally vertical axis with a suitable drive motor. The rotor has an upper and a lower punch guide for receiving upper and lower punches. The punches work together with receivers of a die plate, which is arranged between the punch guides. Press material is fed to the receivers via suitable filling devices. The upper or respectively lower punches work together in pressing stations with upper and lower pressing rollers to compress the press material filled in the receivers into a tablet. In general, suitable control cam sections are provided, which guide the punches in the axial direction over their punch heads. For example, a filling cam section is assigned to a filling station, which ensures that the lower punches in the area of the filling cam section protrude into the receivers to a specified degree. This mass determines the fill volume and thus also the weight of the pressed tablet. The pressed tablets are stripped off the top side of the die plate in a stripping area arranged below this in the direction of rotation. A guide cam is generally provided for this, through which the lower punches are raised far enough that the tablets are captured by the stripper and can be pushed off, for example into a discharge channel. Moreover, a suitable control cam section generally ensures that the upper punches are conveyed away via a filling device. Such a tablet press is for example known from DE 10 2004 040 163 C5.

It is known to equip such rotary tablet presses with different measuring devices or respectively sensors. The measuring devices convert physical measurements into electrical signals, which are then fed to the machine controller of the rotary press and further processed there and/or displayed. The measurement signals of the measuring devices can signal for example the proper state of the rotary press. On the other hand, they can deliver measurement values for determining the quality of the pellets pressed in the press, in particular tablets. For example, measurement sensors for the stiffness of the upper and lower press punches in the punch guide and/or for the tablet discharge force can signal the state of the press. A quality determination of the produced tablets takes place for example via a pressing force measurement at the pre- and/or main pressing station.

In order to meet the strict requirements in the field of pharmaceutical production, the measuring devices must be calibrated and balanced regularly so that a continuously sufficient measurement accuracy and thus production quality is ensured. The results of this calibration are normally documented in the form of a measurement table. For example, an additional reference force measuring device (consisting of a sensor and a measuring device, in particular a measurement amplifier) is installed for example for the calibration of measuring devices arranged in the area of the pressing rollers. The distance between the upper and lower pressing roller is then reduced step by step manually by means of the adjustment drives. Both the measuring device as well as the reference force measuring device are thereby exposed to different force values. Each new force value in the course of the calibration is initiated manually and read by an operator from the measuring devices, in particular from the measuring device to be calibrated, that is in particular a measuring device permanently installed in the press, and the reference force measuring device. The number of calibration steps is normally specified by a process instruction. After each calibration step, a comparison is performed between the measurement values of the measuring device to be calibrated and the reference measuring device. In the case of impermissible deviations, the amplification factor of a measurement amplifier of the measuring device is for example also reset, i.e. balanced, manually. The finally set values are logged in a log form. Several measurement points are thereby normally initiated manually within a force range.

The disadvantage of this procedure is that it can lead to read errors by the operator. Moreover, errors may result during the manual balancing of the measuring device and the logging. The described method also takes a lot of time and punctiform deviations and non-linearities, caused for example by machine tolerances from e.g. storage and guiding, are not generally detected. The same goes for impact variables on the measuring devices, which occur during the operation of the rotary press, for example temperature deviations, wear or other disturbance variables.

Based on the described state of the art, the object of the invention is thus to provide a device and a method of the initially-named type, with which an exact and secure calibration and balancing of the measuring devices is possible in an easy and fast manner.

BRIEF SUMMARY OF THE INVENTION

The invention achieves the object for one through a device for calibrating and balancing a measuring device of a tablet press, in particular a rotary tablet press, comprising at least one reference measuring device and at least one control device, wherein interfaces of the control device are connected with interfaces of the measuring device and the reference measuring device, wherein the control device is designed to generate a plurality of reference measurement results and to record the associated measurement values of the measuring device and the reference measuring device, wherein the control device further comprises a comparing device, with which the recorded measurement values of the measuring device and the reference measuring device can be compared with each other, and wherein the control device is designed to balance the measuring device if an impermissible deviation is present between the compared measurement values. For this, an interface of the control device can be connected with the measuring device. An impermissible deviation is generally present when a permissible difference determined before the calibration between the measuring value of the measuring device to be calibrated and the associated measurement value of the reference force measuring device is exceeded. The control device according to the invention can thereby be designed for the balancing of a measuring device to be checked or respectively the compensation of the determined deviations.

The invention also achieves the object through a method for calibrating and balancing a measuring device of a tablet press, in particular a rotary tablet press, comprising the steps: at least one reference measuring device is provided, a plurality of reference measurement results is generated by a control device and the associated measurement values of the measuring device and the reference measuring device are recorded by the control device, the recorded measurement values of the measuring device and the reference measuring device are compared with each other by means of the control device, if an impermissible deviation is determined between the compared measurement values, the measuring device is balanced by the control device. In turn, an impermissible deviation is generally present when a permissible difference determined before the calibration between the measurement value of the measuring device to be calibrated and the associated measurement value of the reference force measuring device is exceeded. Within the framework of the balancing performed during the method according to the invention, the deviations determined during the calibration are compensated for.

The interfaces can be digital interfaces, analogue interfaces or other data interfaces. According to the invention, an automatic calibration and balancing of the concerned measuring devices thus takes place by the control device. A manual calibration and balancing with the disadvantages explained for the state of the art is not required according to the invention. Rather, according to the invention, only the calibration and balancing process needs to be triggered by an operator, wherein the calibration and balancing steps are then performed automatically. According to the invention, a plurality of reference measurement signals or respectively values, which are recorded by the measuring device and the reference measuring device, are generated for this by the control device. It can be provided that at least one interface of the control device is connected with at least one device for generating reference measurement results. The control device can then initiate this device such that it generates the reference measurement results.

The reference measurement results can be generated in the generally known manner. However, in contrast to the state of the art, this occurs in an automated manner according to the invention. For example, if the measuring device is a force measuring device on an upper or lower pressing roller of the press, then different reference force values can be generated for example by using a test set of an upper or lower punch, of a so-called upper and lower calibration punch, instead of the upper and lower punch used during operation, wherein the pressing rollers are moved into different vertical positions by means of the activation of suitable pressing roller drives, in particular suitable adjustable motors. In particular the vertical distance between the upper and lower pressing roller is thereby reduced. The force measuring devices then each measure different force values according to the approached vertical position. In measuring devices, for example force measuring devices, in which no motor-driven delivery is provided during normal operation of the tablet press, the reference measuring results, for example the reference force values are supplied with other supply devices or the like also to be provided accordingly in order to thus be able to pass through the calibration measurement area. Also in such a case, a corresponding reference measuring device is installed between the measuring device, for example a force sensor, and a counterpoint.

The reference measurement signals or respectively values can be changed in particular step by step or continuously in a specified area. If the measuring devices are for example force measuring devices, a specified force range can be run through continuously, for example. Such a force range can lie for example between 0 and 100 kN. In this manner, punctiform deviations or respectively non-linearities are also detected to the greatest extent possible and can be taken into consideration during the calibration and balancing.

The reference measurement results measured by the measuring device and the reference measuring device are transferred to the control device via the connection of their interfaces. The reference measuring device is connected with the control device via a communication interface for the calibration and balancing according to the invention. The comparing device of the control device compares the measurement values of the measuring device and the reference measuring device recorded for a reference measurement result and determines a deviation between the measurement values for example through subtraction. If this deviation exceeds a specified threshold deviation, it is impermissible and the measuring device is balanced.

The control device can comprise a storage device, in which the measurement values respectively recorded by the reference measuring device and the measuring device in the course of the calibration can be saved. An automated and complete documentation of the calibration and balancing procedures is possible in this manner.

Read errors and errors during a manual correction of the reference measuring devices can be avoided with the automated calibration and balancing according to the invention. The same applies with respect to the creation of the documentation. The calibration and balancing according to the invention takes place simultaneously in a simple and fast manner, wherein punctiform deviations and non-linearities can be corrected in particular during a continuous run-through of a reference measurement area.

The term calibration comprises in this connection the comparison of the measurement values (actual values) of the measuring device with the target measurement values specified by the reference measuring device and the determination of a potential deviation between the measurement values and the target measurement values. The calibration can also comprise a documentation of the results of the comparison. A balancing or respectively an adjustment then takes place according to the invention if the calibration resulted in an impermissible deviation of the measurement values from the target measurement values.

The control device can be designed to balance the measuring device by accessing the measurement results of the measuring device. Such measuring devices generally comprise at least one sensor and at least one measurement amplifier. The balancing can then take place for example through a suitable setting or respectively adjustment of the measurement amplifier. For this, at least one interface of the control device can be connected with an interface of the measurement amplifier. The measurement amplifiers can be located for example inside or outside a force transducer. In the case of the latter, the measurement amplifier can be arranged inside or outside the control device. The control device can also be an integral part of the measurement amplifier. It is also possible that the control device is designed to balance the measuring device by storing an adjustment rule for the measurement results of the measuring device. In this case, no direct impact is thus made to the measurement results by the control device, for example by setting a measurement amplifier. Rather, an adjustment rule for example in the form of a characteristic line or a characteristic field is automatically set and stored based on the comparison performed during the calibration. The adjustment rule can be saved for example in the control device. During subsequent operation, the measurement results of the measuring device are then automatically adjusted with the adjustment rule so that the deviation between the measurement values of the measuring device and reference measuring device determined within the framework of the calibration is compensated. Even when there is direct access to the measurement results of the measuring device within the framework of the balancing, such an adjustment rule can be created as the result of the calibration by the control device. In this case, the adjustment rule forms the basis for the subsequent resetting of the measuring device, for example a measurement amplifier. It is thus possible that the device according to the invention only performs the automated comparison of the measurement values and the automated documentation of the comparison results, which is then subsequently assessed within the framework of an adjustment rule.

As already mentioned, the measuring device and the reference measuring device can be force measuring devices. The reference force measuring device, in particular a reference force transducer or reference force sensor, then preferably lies in the same, in particular unbranched, force flow direction as the measuring device to be calibrated and balanced which is permanently installed in the tablet press, for example a permanently installed force transducer or force sensor. The measuring device can display for example the state of the tablet press or the quality of the tablets pressed with the press. For example, measuring devices for the stiffness of the upper and lower press punches in the punch guide and/or for a tablet discharge force can signal the state of the tablet press. A quality determination of the tablets can take place for example via a pressing force measurement at the pressing stations of the tablet press.

The control device can be part of the machine controller of the tablet press. The machine controller generally comprises a control and an operating unit. It serves to control the entire operation of the tablet press. In the case of this embodiment, the control device is thus part of the machine controller so that no additional control device is required. In a particularly advantageous manner, the machine controller generally already has access to components of the tablet press, for example adjustable motors for the upper and lower pressing rollers, and can thus generate the reference measurement results in a particularly simple manner. Alternatively, it is also possible that the calibration and balancing process according to the invention takes place by a control device separated from the machine controller of the tablet press, which is integrated into the measuring device or the reference measuring device, for example in a measurement amplifier of the measuring device.

The control device can also be designed to create a measurement curve from the recorded measurement values of the measuring device and to balance the measuring device such that the created measurement curves match after the balancing within specified tolerance limits. The measurement curve of the respective measuring device is obtained in that the measurement values of the measuring device to be calibrated are plotted over the reference measurement values respectively assigned to them. The reference curve can be obtained in that the respectively obtained reference measurement value of the reference measuring device is plotted over itself. Aside from a possible anomaly in the area of the origin, which can exist in that, in the case of a reference target measurement value equal to zero, the reference measuring device generates a measurement value not equal to zero, because without a preset force impact from the pressing rollers on the calibrating punches, for example from the dead weight of the upper calibrating punch or from other impact variables, a force impact is generated on the reference measurement sensor, the reference curve generally shows a linearly proportional progression, which can be shifted with respect to the origin in the above sense. The measurement curve of the measuring device can deviate from the reference curve of the reference measuring device. This deviation can be saved in the control device and calculated by means of a mathematical process for compensation so that the measurement progression measured by the measuring device comes as close as possible to the target measurement progress, namely the recorded reference curve of the reference measuring device. Suitable tolerance thresholds around the reference curve can be specified for this.

In order to check an already performed balancing, it can be provided that the method according to the invention is run through again after the calibration and balancing of the measuring device.

The calibration and balancing of the measuring device can continue to take place depending on at least one impact variable occurring during operation of the tablet press, which has an impact on the measuring device, in particular its measurement results. Examples for such impact variables are temperature deviations occurring during operation of the tablet press, wear of components of the tablet press or similar impact variables. The correctly calibrated and balanced connection between a measurement result and a displayed measurement value of the measuring device can change through such impact variables. A new calibration and balancing of the measuring device is hereby required. If the impact of such variables, for example a temperature deviation a length change associated with it or tensioning of press punches or other components, is known, this impact can be taken into account during the assessment of the measurement results of the measuring device without performing an additional calibration and balancing. It is then possible to adjust the measurement results of the measuring devices almost dynamically for the occurrence of such impact variables during normal operation of the table press. Such impact variables can be determined empirically or theoretically or metrologically. It can be determined empirically which temperature deviations occur during the course of normal operation of the tablet press and directly or indirectly impact the measuring devices. Wear of individual components of the tablet press, for example the press punch, can be determined for example theoretically and form the basis for a dynamic adjustment of the measurement values.

According to a further embodiment, the calibration and balancing process according to the invention can be repeated at regular, greater time intervals. It is also possible in this manner to detect and assess or respectively take into consideration in an appropriate manner trending changes in the measuring device or respectively their measurement values. In this connection, greater time intervals mean for example several weeks or several months. Thus, a calibration and balancing can be performed for example at regular intervals of several weeks or several months. This repeated calibration and balancing can take place over the entire service life of the tablet press. A long-term saving of the results of the method for calibration and balancing can take place for this.

The device according to the invention is suitable in particular for carrying out the method according to the invention. The invention also relates to a tablet press, in particular a rotary tablet press, comprising a device according to the invention for calibrating and balancing a measuring device of the tablet press.

BRIEF DESCRIPTION OF THE SEVERAL VIEWS OF THE DRAWINGS

One exemplary embodiment of the invention is explained below in greater detail using figures. They show schematically:

FIG. 1 a part of a rotary press for tablets according to the state of the art in a representation unwound into the drawing plane, FIG. 2 a device according to the invention, FIG. 3 a diagram with measurement curves received by the device from FIG. 2, FIG. 4 a diagram with measurement curves similar to FIG. 3 with selected deviations marked with respect to a reference curve and FIG. 5 a diagram with time-dependent obtained deviations from measurement curves according to FIGS. 3 and 4.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
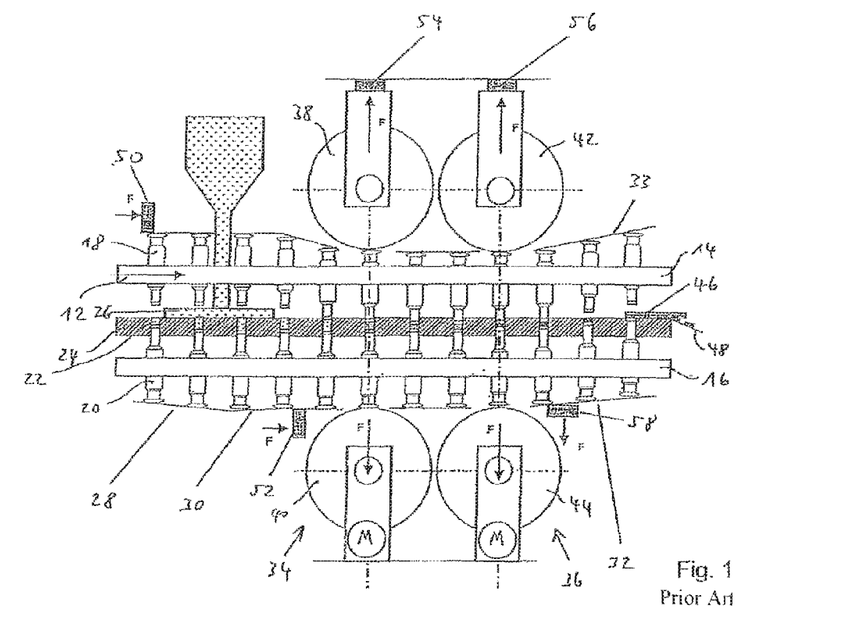

FIG. 1 shows the structure of a generally known rotary tablet press. In particular, the rotor of the rotary tablet press is thereby shown, which is rotated by a rotary drive (not shown) around a generally vertical axis, as shown by the arrow 12. The rotor has an upper punch guide 14 and a lower punch guide 16 for receiving upper punches 18 and lower punches 20. The upper punches 18 and lower punches 20 work together with receivers 22 of a die plate 24, which is arranged between the punch guides 14, 16. The die plate 24 can be designed as one single piece or can consist of individual die segments. The receivers 22 can be so-called die holes. Die casings can be arranged in the die holes. But this is not absolutely required. Powdered press material is fed to the receivers 22 via a filling device 26. The upper and lower punches 18, 20 are guided by filling cam elements 28, dosing cam elements 30, discharge cam elements 32 and lifting cam elements 33. A pre-pressing station 34 and a main pressing station 36 are located downstream in the direction of rotation 12 of the rotor of the filling device 26. The pre-pressing station 34 has an upper pre-pressing roller 38 and a lower pre-pressing roller 40. Accordingly, the main pressing station 36 has an upper main pressing roller 42 and a lower main pressing roller 44. The upper and lower punches 18, 20 work together with the pressing rollers 38, 40, 42, 44 in a generally known manner in order to press the press material filled in the receivers 22 into a tablet. A stripper 46 is located downstream of the pre- and main pressing station 34, 36 in the direction of rotation 12, which at this point in time conveys tablets pushed by the lower punches 20 onto the surface of the die plate 24 to a tablet discharge 56 in a generally known manner.

In the shown example, the rotary tablet press is equipped with several measurement sensors; in the exemplary embodiment, these are force measurement sensors 50, 52, 54, 56, 58. The force measurement sensors measure the force occurring during the operation of the rotary press. Thus, for example, the force measurement sensors 54, 56 arranged in the area of the pre- and main pressing station 34, 36 measure the pressing forces occurring there in order to check the proper state of the rotary press and the proper quality of the produced tablets. The respectively acting forces are shown in FIG. 1 by the arrows labelled with the letter F. In addition to the force measuring sensors 50, 52, 54, 56, 58 measuring devices for measuring these forces generally each comprise a measurement amplifier not shown in FIG. 1.

Figure 2:
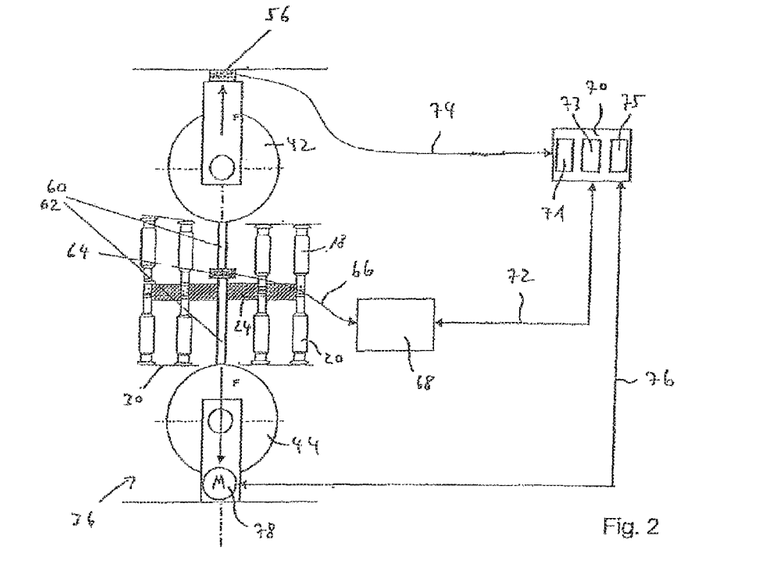

FIG. 2 shows a device according to the invention for calibrating and balancing measuring devices. In the shown example, the force measuring device arranged in the area of the main pressing station 36 should be calibrated and balanced with the force measurement sensor 56. For this, an upper and lower calibrating punch 60, 62 is installed between the upper and lower pressing roller 42, 44, wherein a reference force measurement sensor 64 is arranged between the upper and lower calibrating punch 60, 62. In its embodiment, the reference force measurement sensor 64 agrees with the force measurement sensor 56. There is direct contact between the calibrating punches 60, 62 and the associated main pressing rollers 42, 44. An unaltered force flow between the force measurement sensor 56 and the reference force sensor 64 series-connected with it results excluding the respectively substituted upper and lower punch 18, 20 so that the force F acting upon the force measurement sensor 56 also acts in an unaltered manner upon the reference force sensor 64 arranged between the calibrating punches 60, 62.

The reference force measurement sensor 64 forms a reference measuring device 64, 68 together with the reference measurement amplifier 68 connected with it via a connection 66. A measurement amplifier 71, which is integrated into a control device 70 of the rotary press in the shown example, is also assigned to the force measurement sensor 56. Naturally, the measurement amplifier 71 can also be arranged outside the control device 70, in particular also in the force measurement sensor 56. The control device 70 can be part of the machine controller of the tablet press (not shown). The control device 70 also comprises a comparing device 73 for comparing measurement values and a storage device 75 for storing at least measurement values. The force measurement sensor 56 also forms a measuring device 56, 71 to be calibrated and balanced together with the measurement amplifier 71. The control device 70 generally has an operating and a control element and controls the entire flow of the rotary press during operation. The control device 70 is connected with the measurement amplifier 68 of the reference measuring device 64, 68 via a first connection 72. Moreover, the control device 70 is connected with the measurement amplifier 71 of the measuring device 56, 71. Moreover, the control device 70 is connected with the force measurement sensor 56 to be calibrated and balanced via a second connection 74. Moreover, the control device 70 is connected with an adjustable motor 78 for the setting of the vertical distance between the pressing rollers 42, 44 via a third connection 76.

The calibration and balancing method according to the invention is triggered on the control device 70 by an operator. The control device 70 then starts the adjustable motor 78 via the third connection 76 so that the vertical distance between the pressing rollers 42, 44 is reduced step by step or continuously in a force range of for example 0 to 100 kN. At the same time, the thereby recorded measurement values of the reference measuring device 64, 68 and of the measuring device 56, 71 are fed to the machine controller 70 via the connection 72, 74 or respectively its connection to the respective measurement amplifiers 68, 71. The comparing device 73 integrated into the control device 70 compares these measurement values with each other.

Figure 3:
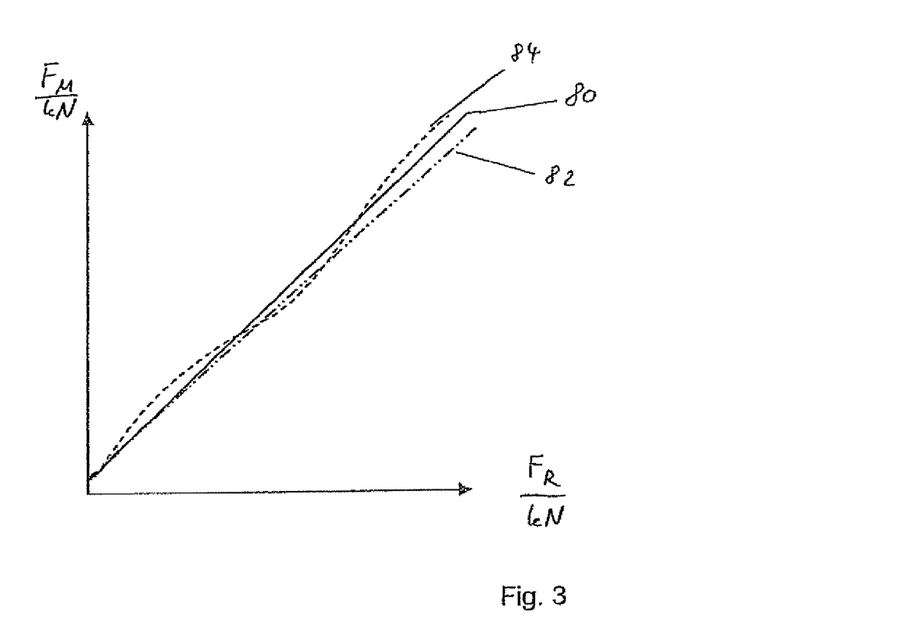

In particular, a curve progression is recorded by the control device 70, as is shown for example in FIG. 3. Reference number 80 shows a linearly proportional curve progression, a so-called reference curve, of the reference measuring device.

The reference measurement values generated by the control device 70, in particular the reference force values $F_R$ generated by the vertical adjustment of the pressing rollers 42, 44, are shown in the diagram on the x-coordinate in kN. The force values $F_M$, associated with the respective reference force values $F_R$ and measured by the measuring device 56, 71 to be calibrated are also shown on the ordinate in kN, wherein the displayed force progressions 82 and 84 each show examples of potentially typical deviations from the reference curve 80. The formation of the reference curve 80 was already described above. In the case of the same scaling of the two axes, it concerns a line with a slope of 45 degrees, which can be shifted by a certain amount with respect to the origin due to the indicated conditions.

Figure 4:
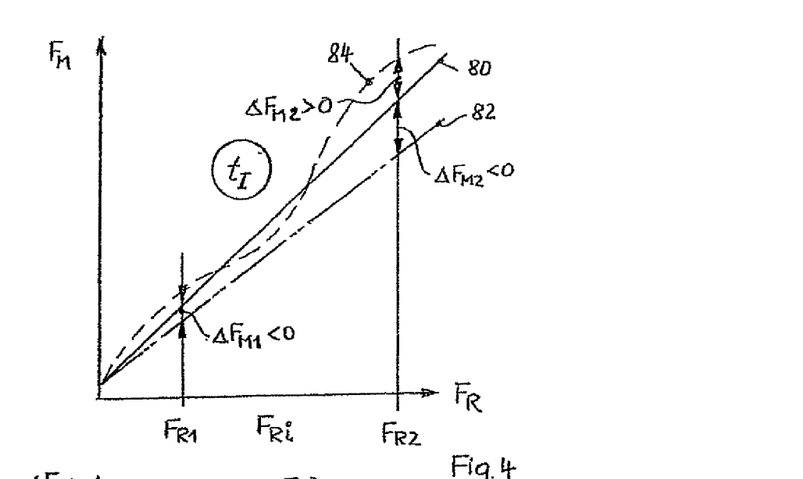

It can be seen in particular in FIG. 4 that the curve progressions 82, 84 of the reference curve 80 deviate in a different manner. While the curve progression 82 with increasing reference force value $F_R$ shows a negative deviation linearly proportional to the amount of the reference force $F_R$ (e.g. $\Delta F_{M1} < 0$ for the position $F_{R1}$ and $\Delta F_{M2} < 0$ for the position $F_{R2}$), i.e. the force value $F_M$ is systematically less than the reference force value $F_R$, the curve progression 84 oscillates around the reference curve 80, i.e. the force values $F_M$ are in some areas greater (e.g. $\Delta F_{M2} > 0$ for the position $F_{R2}$) or less than the respectively assigned reference value force $F_R$, and the deviation maxima are thereby independent of the amount of the assigned force values $F_M$ (FIG. 3) or also dependent on the respective amount (e.g. FIG. 4, position $F_{R2}$ opposite position $F_{R1}$). A person skilled in the area can make conclusions on their causes and the state of the rotary tablet press from these curve progressions 82, 84.

The curve progressions 80, 82, 84 can be saved in the storage device 75 of the control device 70. With the help of mathematical processes, the curve progressions 82, 84 can be adjusted respectively for the reference curve 80 within specified tolerance thresholds. In particular, a required resetting of the measuring device 56, 71 to be calibrated, for example of the measurement amplifier 71 of this measuring device 56, 71, can be calculated. This resetting required for the calibration can then also be performed by the control device 70. For example, the measurement amplifier 71 of the measuring device 56, 71 integrated into the control device 70 in FIG. 2 can be reset by the control device 70.

Figure 5:
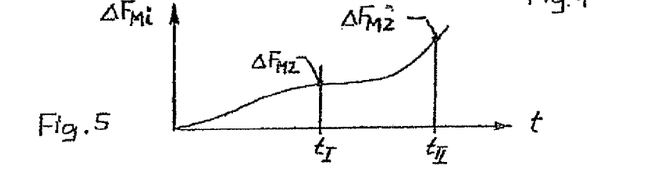

The corresponding curve progressions 82, 84 determined at a calibration time $t_I$ (FIG. 4) or at a later calibration time $t_{II}$ or at any other later calibration times can be saved in the storage device 75 of the control device 70 over longer periods of time. From these curve progressions, the deviations $\Delta F_{M1}$, $\Delta F_{M2}$ (generally: $\Delta F_{Mi}$) for certain marked reference force values $F_{R1}$ $F_{R2}$ (generally: $F_{Ri}$) can be selected (see FIG. 4) and/or read out and determined in their time dependency (time axis t) and/or read out and/or represented (see $\Delta F_{Mi} = f(t)$; FIG. 5) and/or used to control the tablet press. From the deviation progression $\Delta F_{Mi} = f(t)$, at least trending changes in the tablet press (e.g. wear, poor mobility of engaging components, insufficient lubrication) can be detected and maintenance intervals or respectively maintenance times can be determined or the replacement of components can be initiated.

Figure 6:
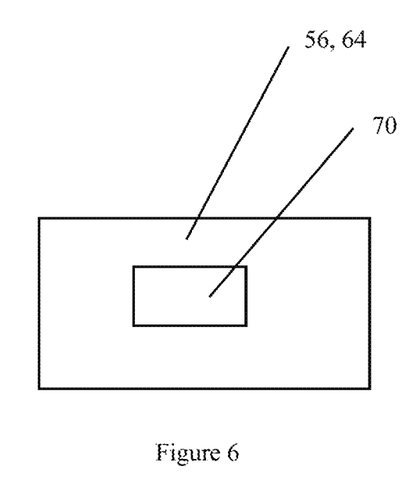
FIG. 6 is a block diagram showing the control device 70 integrated into the measuring device (56, 71) or the reference measuring device (64, 68).

FIG. 6 shows a block diagram showing the control device 70 integrated into the measuring device (56, 71) or the reference measuring device (64, 68).

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A device for calibrating and balancing a measuring device (56, 71) of a tablet press, comprising at least one reference measuring device (64, 68) and at least one control device (70), wherein interfaces of the control device (70) are connected with interfaces of the measuring device (56, 71) and the reference measuring device (64, 68), wherein the control device (70) is configured to generate a plurality of reference measurement results and to record the associated measurement values of the measuring device (56, 71) and the reference measuring device (64, 68), wherein the control device (70) further comprises a comparing device, with which the recorded measurement values of the measuring device (56, 71) and the reference measuring device (64, 68) can be compared with each other, and wherein the control device (70) is configured to balance the measuring device (56, 71) if an impermissible deviation is present between the compared measurement values, and     characterized in that the control device (70) is configured to create one measurement curve each from the recorded measurement values of the measuring device (56, 71) and the reference measuring device (64, 68) and to balance the measuring device (56, 71) such that the measurement curves match within specified tolerance thresholds after the balancing.

2. The device according to claim 1, characterized in that the control device (70) is configured to balance the measuring device (56, 71) through access to the measurement results of the measuring device (56, 71) and/or in that the control device (70) is configured to balance the measuring device (56, 71).

3. The device according to claim 1, characterized in that the measuring device (56, 71) and the reference measuring device (64, 68) are force measuring devices.

4. The device according to claim 1, characterized in that the control device (70) is integrated with a machine controller of the table press.

5. The device according to claim 1 wherein the tablet press is a rotary tablet press.

6. A method for calibrating and balancing a measuring device of a tablet press, comprising the steps:
- at least one reference measuring device (64, 68) is provided,
- a plurality of reference measurement results is generated by a control device (70) and the associated measurement values of a measuring device (56, 71) and of the reference measuring device (64, 68) are recorded by the control device (70),
- the recorded measurement values of the measuring device (56, 71) and of the reference measuring device (64, 68) are compared with each other by means of the control device (70),
- determining that an impermissible deviation is between the compared measurement values, and subsequently balancing the measuring device (56, 71) by the control device (70), and
- characterized in that one measurement curve each is created from the recorded measurement values of the measuring device (56, 71) and of the reference measuring device (64, 68) by the control device (70) and the measuring device (56, 71) is balanced by the control device (70) such that the measurement curves match within specified tolerance thresholds after the balancing.

7. The method according to claim 6, characterized in that the control device (70) balances the measuring device (56, 71) through access to the measurement results of the measuring device (56, 71) and/or in that the control device (70) balances the measuring device (56, 71).

8. The method according to claim 6, characterized in that the measuring device (56, 71) and the reference measuring device (64, 68) are force measuring devices.

9. The method according to claim 6, characterized in that the control device (70) is part of a machine controller of the table press.

10. The method according to claim 6, characterized in that the calibration and balancing of the measuring device (56, 71) takes place depending on at least one impact variable occurring during operation of the tablet press.

11. The method according to claim 10, characterized in that the at least one impact variable is determined empirically or theoretically or metrologically.

12. The method according to claim 10, characterized in that the at least one impact variable is a temperature change occurring during operation of the tablet press or wear occurring during operation of the tablet press.

13. The method according to claim 6, characterized in that, after a completed balancing of the measuring device (56, 71), the method according to claim 7 is performed at least one more time.

14. The method according to claim 6, characterized in that the method according to claim 7 is repeated at regular time intervals so that trending changes in the measurement values of the measuring device (56, 71) are determined.

15. The method according to claim 14, characterized in that a long-term saving of the results of the method for calibrating and balancing takes place.

16. The method according to claim 6 wherein the tablet press is a rotary tablet press.

* * * * *